United States Patent
Stoehr et al.

(10) Patent No.: US 7,553,415 B2
(45) Date of Patent: Jun. 30, 2009

(54) FUEL FILTER WITH CLEAN WATER OUTLET

(75) Inventors: Guido Stoehr, Sassenberg (DE); Ludger Schachtrup, Muenster (DE)

(73) Assignee: Hengst GmbH & Co. KG, Muenster (DE)

( * ) Notice: Subject to any disclaimer, the term of this patent is extended or adjusted under 35 U.S.C. 154(b) by 535 days.

(21) Appl. No.: 11/082,793

(22) Filed: Mar. 18, 2005

(65) Prior Publication Data

US 2005/0274664 A1    Dec. 15, 2005

(30) Foreign Application Priority Data

Mar. 19, 2004  (DE)  ................... 20 2004 004 330 U

(51) Int. Cl.
*B01D 36/04* (2006.01)
*B01D 36/02* (2006.01)
*B01D 35/16* (2006.01)

(52) U.S. Cl. ............ 210/248; 210/299; 210/313; 210/305

(58) Field of Classification Search ............ 210/299, 210/313, 248, 305
See application file for complete search history.

(56) References Cited

U.S. PATENT DOCUMENTS

| 1,401,976 | A | * | 1/1922 | Giovannoni | 210/306 |
| 2,864,505 | A | * | 12/1958 | Kasten | 210/315 |
| 3,016,345 | A | * | 1/1962 | Price | 208/187 |
| 3,297,161 | A | * | 1/1967 | Kasten | 210/114 |
| 3,312,350 | A | * | 4/1967 | Kasten | 210/307 |
| 3,651,944 | A | * | 3/1972 | Shuttleworth | 210/265 |
| 3,666,108 | A | * | 5/1972 | In 'T Veld | 210/305 |
| 3,977,975 | A | * | 8/1976 | Geurtsen | 210/315 |
| 4,065,392 | A | * | 12/1977 | Gammon | 210/282 |
| 4,102,787 | A | * | 7/1978 | Geurtsen | 210/104 |
| 4,111,806 | A | * | 9/1978 | Wright et al. | 210/115 |
| 4,456,529 | A | * | 6/1984 | Shinaver | 210/306 |
| 4,637,351 | A |   | 1/1987 | Pakula |  |
| 5,916,442 | A | * | 6/1999 | Goodrich | 210/311 |

FOREIGN PATENT DOCUMENTS

| DE | 3709883 | 1/1987 |
| DE | 4409570 | 5/1995 |
| EP | 0267014 | 11/1988 |
| WO | 0194773 | 12/2001 |

* cited by examiner

*Primary Examiner*—Thomas M Lithgow
(74) *Attorney, Agent, or Firm*—Greenblum & Bernstein, P.L.C.

(57) ABSTRACT

A process for measuring and controlling the circulation of fluids in endoscope channels that includes placing at least one endoscope into a tank. Further, one or more inlet channels of the endoscope are coupled to one or more valves with connectors, saturating the tank and inlet channels with a fluid from at least one fluid supply in fluid communication with at least one circulation pump. Further still, at least one hermetic chamber having a known volume and the one or more valves, such that the hermetic chamber and valves are completely filled with the fluid. Controlling the fluid flow within the hermetic chamber with at least one controller, wherein the controller controls and records the emptying with one or more sensors detecting a high level and a low level of the fluid, and verifies the known fluid volume and flow rate from the recorded emptying of the hermetic chamber.

9 Claims, 3 Drawing Sheets

FUEL FILTER WITH CLEAN WATER OUTLET

CROSS-REFERENCE TO RELATED APPLICATIONS

The present application claims priority under 35 U.S.C. §119 of German Patent Application No. 20 2004 004 330.0, filed on Mar. 19, 2004, the disclosure of which is expressly incorporated by reference herein in its entirety.

BACKGROUND OF THE INVENTION

1. Field of the Invention

The invention relates to a fuel filter with a cooling chamber for water separated from the fuel.

2. Discussion of Background Information

Generic fuel filters include a collecting chamber for draining water out of the fuel filter and directly out of the engine via a drain plug. More specifically, water exiting the engine most likely includes contaminants from the fuel system and this discharge will likely pollute the environment. Thus, there exists a need to provide a fuel filter that can discharge water from a fuel system of an internal combustion engine or the like, which as clean as possible, so as to reduce polluting the environment.

WO 01/94773 A1 shows a filter of the above-noted type that treats the discharge water with regard to a draining frequency such a filter includes an automatic bleed unit for automatically draining water accumulated in a fuel filter of a vehicle, e.g. a diesel engine. In particular, the automatic bleed unit includes a microprocessor connected to a sensor device and withdrawal device. The sensor device is associated with a chamber of the fuel filter that detects water separated from the fuel that accumulates in the withdrawal device. The microprocessor, upon receiving a pre-determined level signal from the sensor device discharges the water from the withdrawal device, when the engine is at rest and the relative electrical system of the engine is live. The sensor device has several differential level readings that are sent to a monitoring system connected to the microprocessor. The monitoring system includes two measurements members, each sensitive to a level between the predetermined level and the depth of the accumulation chamber. When the water reaches a predetermined level, the microprocessor in response to the signal emitted by one or the other of the measurement members, energizes the withdrawal device. Thus, the use of two sensors provides an improved reliability over the prior art, such that the prior art utilized moveable elements to detect water levels, such that contaminants in the system could restrict the movements of the moveable elements causing failure.

DE 44 09 570 A1 shows a separating device integrated into a generic fuel filter that separates water from the fuel and collects the water in a collecting chamber, so as not to discharge pollutants, e.g., water mixed with fuel, into the environment. The water from the collecting chamber is injected into an intake pipe of an internal combustion engine when a full indication signal from a sensor from the collecting chamber is triggered. The water removed from the fuel system is highly heated by heat generated from the internal combustion engine, and thus the water mixed with fuel is not discharged into the environment.

U.S. Pat. No. 4,637,351 shows a separating device integrated into a generic fuel filter, wherein a predetermine level of a collecting chamber is triggered by a full level signal from a sensor, indicating the collecting chamber is full. In particular, the collecting chamber collects water-mixed with fuel, upon a full level signal from the sensor, the water-mixed with fuel is injected into an intake line or exhaust line of an internal combustion engine. More specifically, the heat generated from the internal combustion engine burns the water mixed with fuel, and vapor is discharged into the environment causing additional environmental pollution.

Thus, there exists a need to provide a fuel filter that can discharge water from a fuel system of an internal combustion engine or the like, which is clean as possible, so as to reduce polluting the environment.

SUMMARY OF THE INVENTION

The present invention provides a fuel filter in which a settling chamber for dirt particles is provided before an outlet opening in a flow direction of the water.

The present invention includes a settling chamber for dirt particles arranged in an area within the fuel filter where the water has primarily separated from the fuel. The separated water, which is heavy compared to the fuel, can reach the settling chamber before it can reach the clean side of the fuel filter, such that the dirt particles from the separated water accumulates in the settling chamber. The separated water flows from the settling chamber into the collecting chamber, whereby the dirt particles are held back in the settling chamber. Since the dirt particles are held back from the separated water before reaching the outlet opening of the collecting chamber, clean water can be injected in a nozzle with minimal negative effects, for example:

1. Since the dirt particles are held back there is minimal impairment of the function of the nozzle, as opposed to the prior art where dirt particles accumulate on components of the nozzle and clog or jam movable parts of the nozzle causing possible failure of the nozzle.
2. Further, the water can be injected, e.g., into the air suction passage or into the exhaust passage of an internal-combustion engine, and thus can easily be extracted from the fuel system in the form of steam without the dirt particles being combusted too and being able to pollute the environment.

The substances released into the environment are therefore as clean as possible, while the dirt particles are concentrated in the settling chamber of the filter and can be removed in a correspondingly controlled manner.

Advantageously, a particle filter can be provided, e.g., for lighter particles that do not settle in the settling chamber, but which should nevertheless be held back. This particle filter is therefore arranged behind the settling chamber in the flow direction of the water, so that the heavier particles can settle in the desired manner. The particle filter is permeable to water, so that water can leave the settling chamber, but the lighter or smaller and entrained particles are reliably held back by the particle filter.

The settling chamber can be realized on a component removed from the filter, so that easy access to the collected dirt particles is possible. For example, the cleaning of the settling chamber can take place during a so-called filter change, when a replaceable filter element is changed, or replaced.

When a component is used, which can preferably be removed from the filter, the above-mentioned particle filter can be attached to this component so that it can be handled together with the component.

Further, this can facilitate the handling of the component, e.g., during the installation of the filter, as well as reliably ensure that the particle filter is arranged on the component in an optimally effective manner. Thus, problems resulting from installation of the particle filter, such as leaks can cause bypass to the particle fluid when the particle filter and the remaining component are embodied separately from one another, can be eliminated.

According to the present invention, the fuel filter may be structured and arranged similar to a cup filter, such that a ring is provided that forms the settling chamber. Further, the ring may have an approximately U-shaped cross section forming a groove arranged geodetically below the dirty collection area of the filter, such that the connection to the dirty collection area is arranged in a flow-effective manner.

The ring can also be used for cleaning the housing of the cup filter, such that if dirt collects on the dirty side of the filter, dirt can be deposited on the housing wall. Thus, during or after removal of the filter element, the inside wall of the housing can be cleaned through a circumferential scraper lip provided on the ring, when the ring is removed from the housing.

It can be particularly advantageous for the scraper lip to be divided into several segments (or lamellas) arranged or distributed over the circumference, such that an undesirable creasing of the scraper lip can be avoided.

In addition, the scraper lip can guide the dirt scraped from the cup wall into the settling chamber, such that the dirt particles are moved in a controllable manner. Further, the radially outer wall of the settling chamber can be extended upwards and outwards continuously, so as to form the scraper lip. The wall shape of the ring (of the filter cup) is structured and arranged in such a way to allow dirt scraped from the cup wall to automatically reach the settling chamber, thus preventing dirt from reaching undesirable areas within the fuel system.

The present invention overcomes the prior art, e.g., using filtration non-woven, moveable components with centrifugal separators and the like, by providing a cost-effective, functionally reliable and low-resistance labyrinth collector in a ring-shaped separating wall that extends into the settling chamber or into the groove of the ring. The water getting into the groove has to bypass underneath the separation wall, subsequently rise again, and only then, reach the outlet opening provided on the ring. The effect of the water flow changes in a reversal of the water flow by approximately 180°, such that heavy particles contained in the water are eliminated from the water flow. Resulting in the heavy particles or dirt particles collecting in the lower area of the settling chamber due to changes in inertia and the length of time of the water flow. With such a labyrinth collector, the designation "settling chamber" appropriately illustrates that the heavy particles actually settle, while with other eligible constructions the designation means only that the dirt particles are deposited, i.e., separated from the water.

In addition, the ring can be connected to the filter element. For example, during a replacement of the filter element, the ring can be automatically accessible for cleaning out the contaminants, or the ring can be removed together with the filter element. Thus, the contaminants can be removed in a controlled manner, for example: contaminants can be collected in the fuel dirty area of the filter, or contaminants can be conveyed by the scraper lip into the settling chamber, or the contaminants can be separated from the water.

In addition, the ring can be detachable from the filter element, such that both the ring and filter element can be removed separately if necessary.

The present invention provides a functional interaction between the filter element and the ring in the form of the separation wall projecting into the groove. Such that the separation wall is formed by a rib on the filter element that projects downwards, whereby the connectability between ring and filter element renders easy production of the filter element, as well as eliminating costly injection molds for the ring which can be complicated to produce.

In addition, the separation of water from fuel can be improved through a hydrophobic filter medium, such that filter capacity and cost concerned with the filter medium could be made of paper, e.g., in the form of a paper folded filter element.

BRIEF DESCRIPTION OF THE DRAWINGS

The present invention is further described in the detailed description which follows, in which like reference numerals represent similar parts throughout the several view of the drawings, and wherein.

DETAILED DESCRIPTION OF THE PRESENT INVENTION

Figure 1:
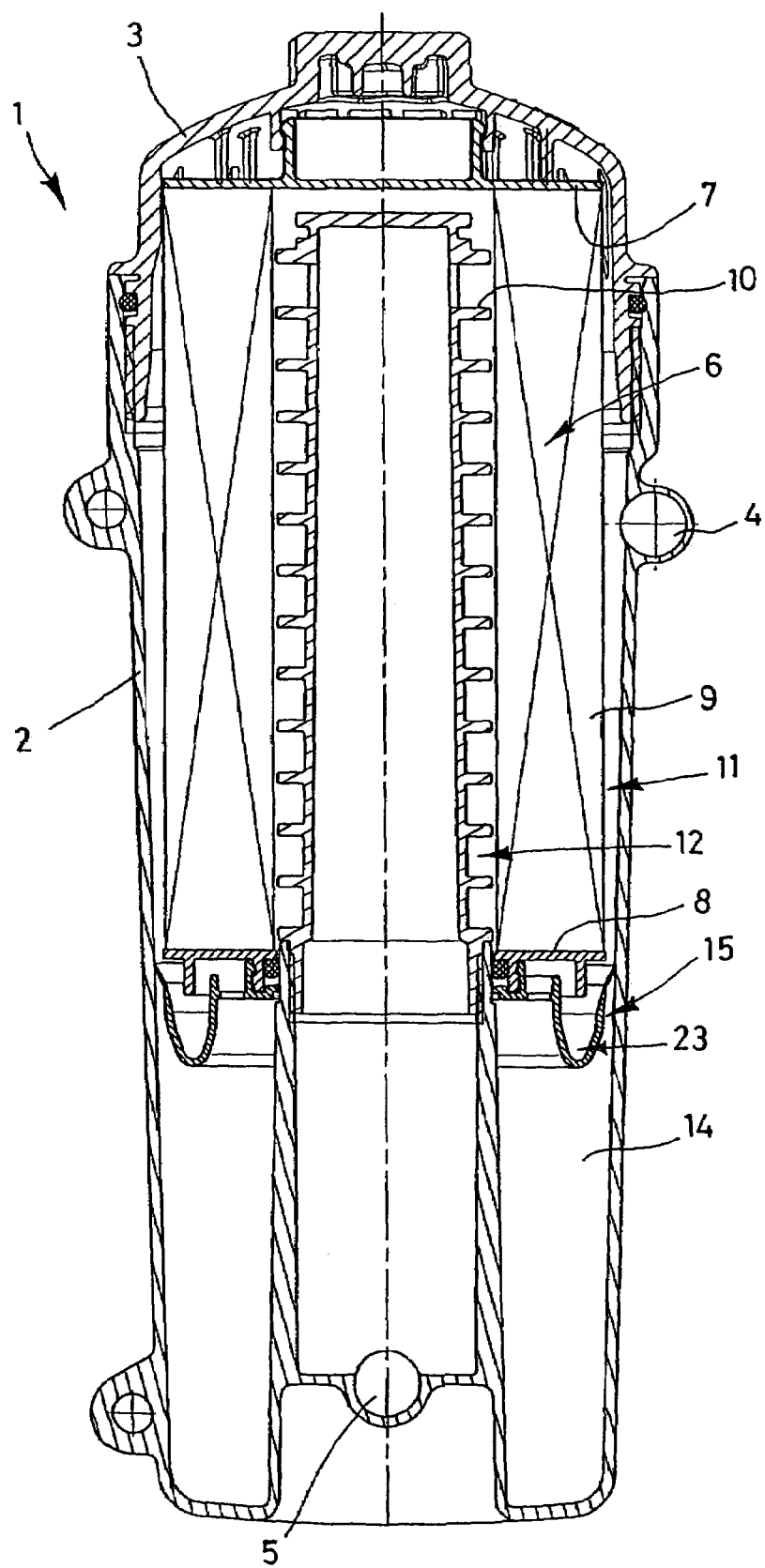
FIG. 1 A vertical section through a first exemplary embodiment of a fuel filter according to the innovation, FIG. 2 A section of FIG. 1 in the area of the lower edge of the filter element on a larger scale compared to FIG. 1, and FIG. 3 A view similar to FIG. 2 but of a second exemplary embodiment.

FIG. 1 shows by way of example a profile structure that can be embodied according to the invention. This profile structure includes a fuel filter 1 featuring a cup-shaped housing 2 closed with a screw cap 3, a dirty side inlet opening 4 and a clean side outlet opening 5 for the fuel.

According to the invention, the fuel is filtered through a filter element 6, which is clipped to the screw cap 3 by an upper end disk 7. The filter element 6 features a ring-shaped lower end disk 8 provided on the opposite face end, such that between the two end disks 7 and 8, a filter medium 9, e.g., in the form of a hydrophobic paper folded filter, is positioned.

The filter element 6 is supported in the center by a support dome 10, which further supports the filter medium 9. In addition, support dome 10 prevents filter medium 9 from collapsing due to normal operational effects, such as temperature and pressure. Furthermore, the support dome 10 features passage openings through which the cleaned fuel can reach the hollow interior of the tubular support dome 10, permitting the cleaned fuel to flow to outlet opening 5.

Due to the round cross-sectional geometry of the fuel filter 1, a dirty area 11 results around the filter medium 9, and a clean area 12 of the fuel filter 1 results radially inside the filter medium 9.

A collecting chamber 14 is provided below the filter element 6 for water which is separated from the fuel. The separated water can be drained off from the collecting chamber 14 in a manner known within the art and is not shown in detail. For example, the water can be drained off automatically by a sensor-controlled device, such that the water is conducted to a nozzle, and injected into a suction passage or exhaust passage of an internal-combustion engine.

Figure 2:
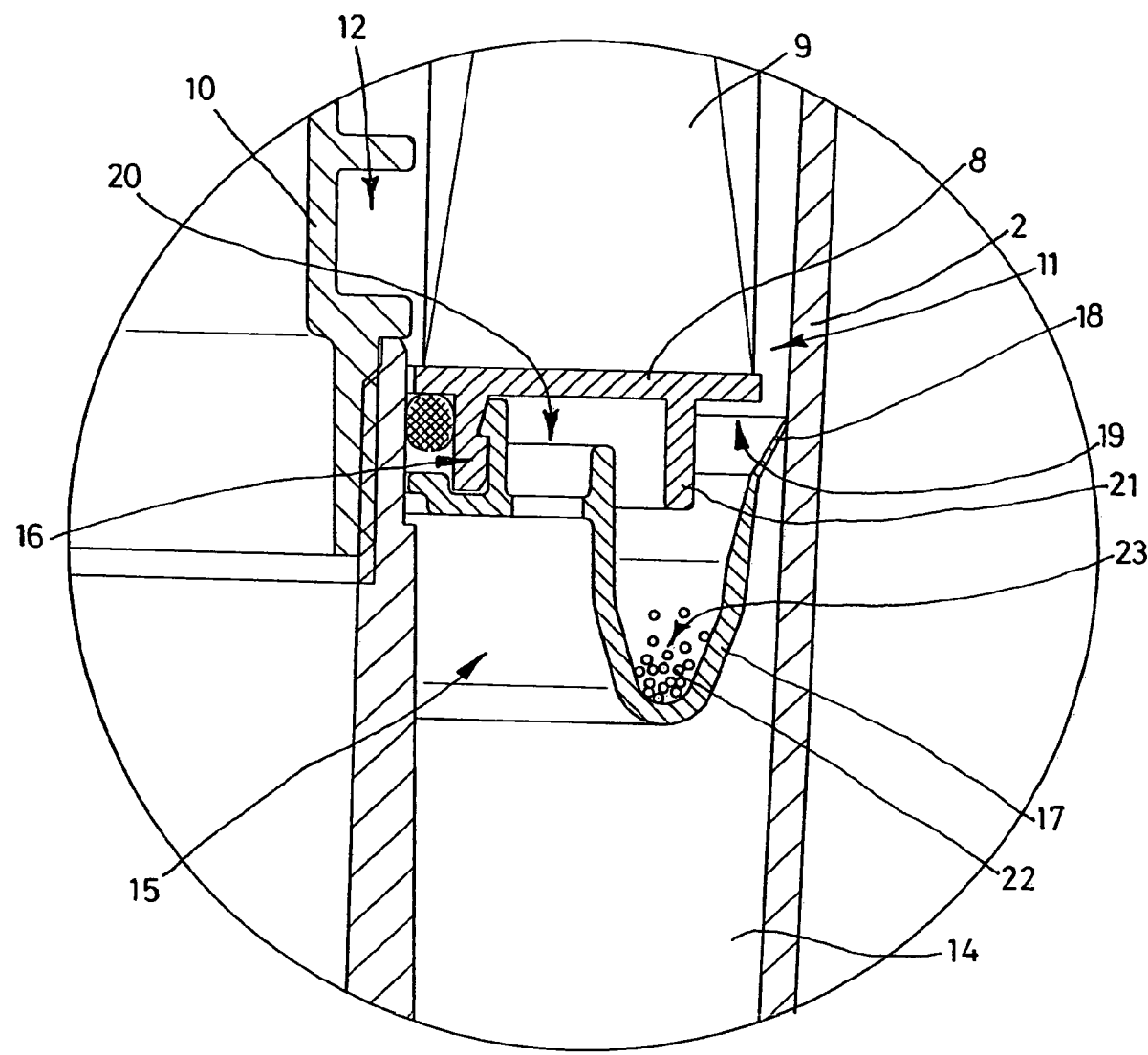

FIG. 2 shows the area of the lower end disk 8 of the filter element 6 on a larger scale compared to FIG. 1. FIG. 2 shows a ring 15 clipped under the lower end disk 8, such that the clip connection is indicated at 16.

The ring 15 forms a peripheral groove 17, such that the outer wall runs directly upwards and outwards, tapering towards its free end, such that the ring 15 rests on the inner wall of the housing 2. In addition, an elastically deformable scraper lip 18 may be arranged on the furthermost end of the outer wall of the ring 15, so as to rest on the inner wall of the housing 2. Since the free inner cross section of the housing 2 is enlarged upwards, the elastic deformability of the scraper lip 18 is structured and arranged, so as to scrape along the inner wall of the housing 2, when removed from the filter unit 1. In addition, during this removal process of the elastically deformable scraper lip 18, dirt is removed from the inner wall of the housing, such that the scraped dirt is transferred into groove 17. The upper edge of the scraper lip 18 defines a ring-shaped inflow opening 19 of the groove 17, through which the water settling downwards out of the fuel due to gravity arrives in groove 17. A corresponding outlet opening 20 of the ring 15 is defined by the radially inner upper edge of groove 17. The Outlet opening 20 lies geodetically lower than the inflow opening 19, so when water flows from inflow opening 19 into groove 17, the water seeks to flow out of the water-filled groove 17, and through outlet opening 20. Thereby a change of direction by approximately 180° is enforced in the flow course of the water by a separating wall 21, which is formed as a rib projecting downwards on the lower end disk 8, thus extending deeper than the outlet opening 20. Because of this flow reversal, a labyrinth collector effect is produced for particles heavier than the water, such that the dirt particles 22 settle in the lower area of the groove 17. The water separated from dirt particles 22 flows from the groove 17 at outlet opening 20, to collecting chamber 14.

In its lower area, the groove 17 forms a settling chamber 23 for the dirt particles 22. A separating wall 21 is arranged far enough above the settling chamber 23, so as not to affect the dirt particles 22 from settling in the settling chamber 23, when the water flows through groove 17 and out to ring 15.

The size ratios shown in the drawing are only by way of example and purely diagrammatic, and in no way limit the scope of the invention. Compared to the exemplary embodiment shown, the separating wall 21 can also be shorter or longer, thus can be embodied, e.g., extending further into the groove 17. A longer separating wall 21 can improve the labyrinth collector effect. The groove 17 can be embodied to be deeper than shown in the drawing, such that the separating wall 21 does not disrupt the flow through the groove 17, so as to move the deposited dirt particles from the settling chamber, out to ring 15.

Figure 3:
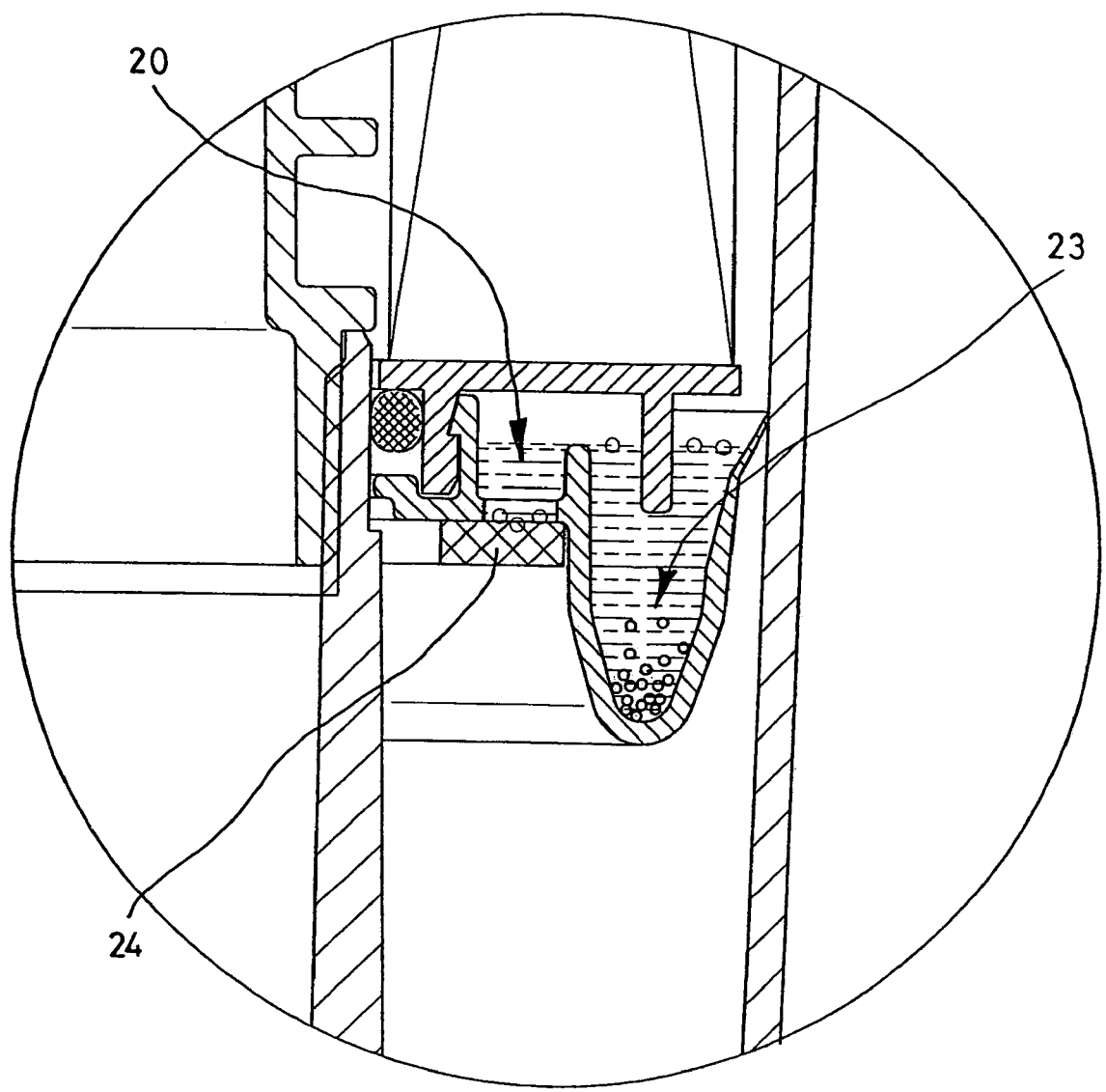

FIG. 3 shows a particle filter 24 provided below the outlet opening 20. The particle filter 24 is permeable to water and thus renders possible the unimpeded draining downwards of the cleaned water through the outlet opening 20 and out of the ring 15. Lighter particles entrained within the flow of the water or particles, which do not settle in the settling chamber 23, due to their specific weight, can be reliably held back by particle filter 24. In addition, the resulting effect of including particle filter 24 to the fuel filter 1, is water exiting the ring 15, exhibits a high level of purity. Since the construction of the filter shown in FIG. 3 is otherwise identical to the exemplary embodiment described on the basis of FIGS. 1 and 2, the components otherwise comparable with FIG. 2 are not individually designated and labeled by reference numbers for reasons of clarity.

The invention claimed is:

1. A filter unit comprising:
    a collecting chamber for a first fluid separated from a second fluid having an outlet opening for said first fluid;
    a settling chamber for particles arranged before said outlet opening in a flow direction of said first fluid;
    a housing having a cup shape;
    a cylindrical filter element; and
    a ring having an approximate U-shaped cross section arranged geodetically below a dirty area surrounding at least a portion of said cylindrical filter element.

2. The filter unit in accordance with claim 1, wherein a circular groove formed by said approximate U-shaped cross section forms said settling chamber.

3. The filter unit in accordance with claim 2, wherein said ring, on an outermost circumference, forms an elastically deformable scraper lip structured and arranged to contact the housing.

4. The filter unit in accordance with claim 3, wherein said lip is arranged into several lamellas that are distributed over the circumference of said ring.

5. The filter unit in accordance with claim 3, wherein said lip extends upward and radially outwards from an outer wall of said ring to define said groove.

6. The filter unit in accordance with claim 1, wherein a ring-shaped separation wall extends into said groove, such that said water flowing into said settling chamber, causes a deflection of said first fluid in the flow direction, and said first fluid is guided under said separation wall to an outlet opening of said ring.

7. The filter unit in accordance with claim 6, wherein an inflow opening and said outlet opening of said ring are arranged approximately higher than a lower edge of said separation wall.

8. The filter unit in accordance with claim 1, wherein said ring is connected to said filter element by a clip connection.

9. The filter unit in accordance with claim 6, wherein said separation wall is formed by a rib formed on said filter element.

* * * * *